US011651454B2

(12) United States Patent
Yusa

(10) Patent No.: US 11,651,454 B2
(45) Date of Patent: May 16, 2023

(54) INFORMATION PROCESSING APPARATUS, INFORMATION PROCESSING METHOD, AND NON-TRANSITORY COMPUTER READABLE MEDIUM STORING PROGRAM

(71) Applicant: NEC Corporation, Tokyo (JP)

(72) Inventor: Michihiko Yusa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/041,673

(22) PCT Filed: Oct. 30, 2018

(86) PCT No.: PCT/JP2018/040290
§ 371 (c)(1),
(2) Date: Sep. 25, 2020

(87) PCT Pub. No.: WO2019/187290
PCT Pub. Date: Oct. 3, 2019

(65) Prior Publication Data
US 2021/0012437 A1     Jan. 14, 2021

(30) Foreign Application Priority Data
Mar. 29, 2018 (JP) .............................. JP2018-066015

(51) Int. Cl.
*G06Q 50/10* (2012.01)
*G06Q 30/02* (2023.01)
(Continued)

(52) U.S. Cl.
CPC ............. *G06Q 50/10* (2013.01); *G06Q 30/02* (2013.01); *G06Q 30/06* (2013.01); *G08G 1/04* (2013.01)

(58) Field of Classification Search
CPC . G07F 17/0014; G06T 7/215; H04N 21/4223; B60L 55/00; G06Q 10/06
See application file for complete search history.

(56) References Cited

U.S. PATENT DOCUMENTS

| 2002/0065747 | A1* | 5/2002 | Nagano | G06Q 30/0643 |
| | | | | 715/255 |
| 2004/0102930 | A1* | 5/2004 | Nakamitsu | G07F 17/0014 |
| | | | | 702/188 |

(Continued)

FOREIGN PATENT DOCUMENTS

| JP | 2002-245357 A | 8/2002 |
| JP | 2007-110479 A | 4/2007 |

(Continued)

OTHER PUBLICATIONS

International Search Report and Written Opinion corresponding to PCT/JP2018/040290, dated Jan. 22, 2019 (10 total pages).

*Primary Examiner* — Saba Dagnew

(57) ABSTRACT

The present disclosure provides an information processing apparatus, an information processing system, an information processing method, and a program that are capable of promoting the improvement of an environment for performing processing using desired video image data about a traffic state. The information processing apparatus (1) includes: a camera video image acquisition unit (2) configured to acquire video image data from a camera configured to shoot a traffic state; and a remuneration determination unit (3) configured to determine a remuneration for provision of an environment for the camera video image acquisition unit (2) to acquire the video image data based on a feature of the camera.

10 Claims, 8 Drawing Sheets

(51) Int. Cl.
*G06Q 30/06* (2023.01)
*G08G 1/04* (2006.01)

(56) References Cited

U.S. PATENT DOCUMENTS

| | | | |
|---|---|---|---|
| 2011/0150434 A1* | 6/2011 | Takano | H04N 21/4223 |
| | | | 348/222.1 |
| 2013/0218624 A1* | 8/2013 | Ikeda | G06Q 10/06 |
| | | | 705/7.22 |
| 2014/0077766 A1* | 3/2014 | Takeuchi | G06Q 30/06 |
| | | | 320/128 |
| 2014/0122702 A1* | 5/2014 | Jung | H04L 67/535 |
| | | | 709/224 |
| 2014/0348378 A1* | 11/2014 | Liu | G06T 7/215 |
| | | | 382/103 |
| 2016/0323559 A1 | 11/2016 | Matsunobu et al. | |

FOREIGN PATENT DOCUMENTS

| | | |
|---|---|---|
| JP | 2014-064241 A | 4/2014 |
| JP | 2015-028675 A | 2/2015 |
| JP | 2016-103788 A | 6/2016 |
| JP | 2016-213808 A | 12/2016 |
| JP | 2017-219930 A | 12/2017 |

\* cited by examiner

| CAMERA ID | USER ID | ENVIRONMENT INFORMATION | | | | |
|---|---|---|---|---|---|---|
| | | INSTALLATION POSITION INFORMATION | CAMERA PERFORMANCE INFORMATION | POWER SOURCE INFORMATION | NETWORK INFORMATION | ... |
| C001 | U001 | AAAAA1 | BBBBB1 | CCCCC1 | DDDDD1 | ... |
| C002 | U002 | AAAAA2 | BBBBB2 | CCCCC2 | DDDDD2 | ... |
| .. | .. | .. | .. | .. | .. | .. |

Fig. 3

INFORMATION PROCESSING APPARATUS, INFORMATION PROCESSING METHOD, AND NON-TRANSITORY COMPUTER READABLE MEDIUM STORING PROGRAM

CROSS-REFERENCE TO RELATED APPLICATIONS

This application is a national stage application of International Application No. PCT/JP2018/040290 entitled "INFORMATION PROCESSING APPARATUS, INFORMATION PROCESSING SYSTEM, INFORMATION PROCESSING METHOD, AND NON-TRANSITORY COMPUTER READABLE MEDIUM STORING PROGRAM," filed Oct. 30, 2018, which claims the benefit of the priority of Japanese Patent Application No. 2018-066015, filed on Mar. 29, 2018, the disclosures of each of which are hereby incorporated by reference in their entirety.

TECHNICAL FIELD

The present disclosure relates to an information processing apparatus, an information processing system, an information processing method, and a program.

BACKGROUND ART

A system that performs processing such as monitoring or analysis of traffic using Information and Communication Technology (ICT) is known (e.g., Patent Literature 1). Incidentally, when processing using video image data obtained by shooting a traffic state is performed, how to improve an environment for the processing becomes a problem.

In this regard, Patent Literature 2 discloses a system for providing a wireless LAN in which when an owner of wireless LAN equipment provides the owned wireless LAN equipment to a mobile user as an access point, a charge for providing the equipment or the like is received as a price for the provision.

CITATION LIST

Patent Literature

Patent Literature 1: Japanese Unexamined Patent Application Publication No. 2015-028675
Patent Literature 2: Japanese Unexamined Patent Application Publication No. 2007-110479

SUMMARY OF INVENTION

Technical Problem

When processing is performed using video image data obtained by shooting a traffic state, it is important what kind of video image data can be used. In the system disclosed in Patent Literature 2, a uniform price is paid to all access points in accordance with the number of connections or the amount of connection time. Accordingly, when the technique disclosed in Patent Literature 2 is applied to the acquisition of video image data, a uniform price is paid regardless of whether the video image data acquired by the provision of the equipment is the desired one. Thus, the system disclosed in Patent Literature 2 cannot promote the improvement of an environment for performing processing using desired video image data about a traffic state.

Therefore, one of the objects to be attained by an example embodiment disclosed herein is to provide an information processing apparatus, an information processing system, an information processing method, and a program that are capable of promoting the improvement of an environment for performing processing using desired video image data about a traffic state.

Solution to Problem

An information processing apparatus according to a first aspect includes: camera video image acquisition means for acquiring video image data from a camera configured to shoot a traffic state; and remuneration determination means for determining a remuneration for provision of an environment for the camera video image acquisition means to acquire the video image data based on a feature of the camera.

An information processing system according to a second aspect includes: a camera configured to shoot a traffic state; and an information processing apparatus, in which the information processing apparatus includes: camera video image acquisition means for acquiring video image data from the camera; and remuneration determination means for determining a remuneration for provision of an environment for the camera video image acquisition means to acquire the video image data based on a feature of the camera.

An information processing method according to a third aspect includes causing an information processing apparatus to: acquire video image data from a camera configured to shoot a traffic state; and determine a remuneration for provision of an environment for acquiring the video image data based on a feature of the camera.

A program according to a fourth aspect causes a computer to execute: a camera video image acquisition step of acquiring video image data from a camera configured to shoot a traffic state; and a remuneration determination step of determining a remuneration for provision of an environment for acquiring the video image data based on a feature of the camera.

Advantageous Effects of Invention

According to the above-described aspects, it is possible to provide an information processing apparatus, an information processing system, an information processing method, and a program that are capable of promoting the improvement of an environment for performing processing using desired video image data about a traffic state.

BRIEF DESCRIPTION OF DRAWINGS

FIG. 3 is a schematic diagram showing an example of a configuration of data stored in an environment information storage unit;

DESCRIPTION OF EMBODIMENTS

Outline of Example Embodiment

Figure 1:
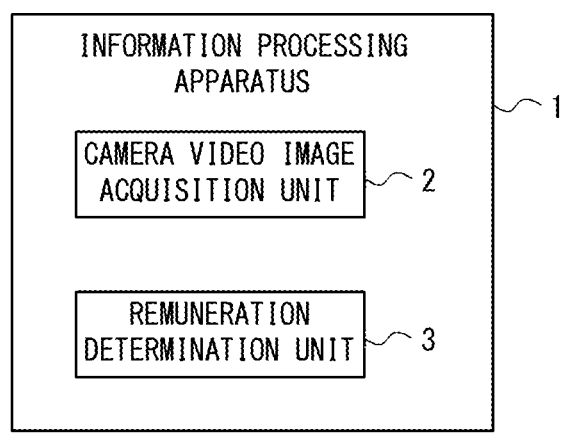
FIG. 1 is a block diagram showing an example of a configuration of an information processing apparatus according to an outline of an example embodiment.

Prior to describing an example embodiment in detail, an outline of the example embodiment is given. FIG. 1 is a block diagram showing an example of a configuration of an information processing apparatus 1 according to the outline of the example embodiment. As shown in FIG. 1, the information processing apparatus 1 includes a camera video image acquisition unit 2 and a remuneration determination unit 3.

The camera video image acquisition unit 2 acquires video image data from a camera (not shown in FIG. 1) that shoots a traffic state. Although the camera video image acquisition unit 2 acquires the video image data transmitted by the camera via, for example, a wired or wireless network, it may instead acquire the video image data by loading the video image data stored in a storage medium. As described above, it is sufficient for the camera video image acquisition unit 2 to acquire image data, and thus any method for acquiring video image data may be employed.

The video image data acquired by the camera video image acquisition unit 2 may be used to execute predetermined processing. Note that the predetermined processing may be any processing using video image data, and may be, for example, processing for monitoring or analyzing a traffic state that involves image processing.

The remuneration determination unit 3 determines a remuneration for provision of an environment for the camera video image acquisition unit 2 to acquire video image data based on features of a camera. That is, the remuneration determination unit 3 calculates a remuneration in accordance with the features of the camera. It should be noted that the features of the camera are any features that affect the qualities of video image data, and include, for example, the installation place of the camera and the performance of the camera. Accordingly, the qualities of the video image data described herein are any qualities including the quality of the content of shooting and the image quality.

As described above, in the information processing apparatus 1, the remuneration determination unit 3 calculates a remuneration in accordance with the features of the camera. Accordingly, it is possible to determine a remuneration in accordance with the features of the camera instead of a uniform remuneration. Thus, it is possible to increase the value of the remuneration for provision of an environment in which more preferable video image data can be acquired in executing predetermined processing as compared with when such an environment is not provided. Therefore, it is possible to promote the improvement of an environment (more specifically, an environment for acquiring video image data) for performing processing using desired video image data about a traffic state.

Details of Example Embodiment

Figure 2:
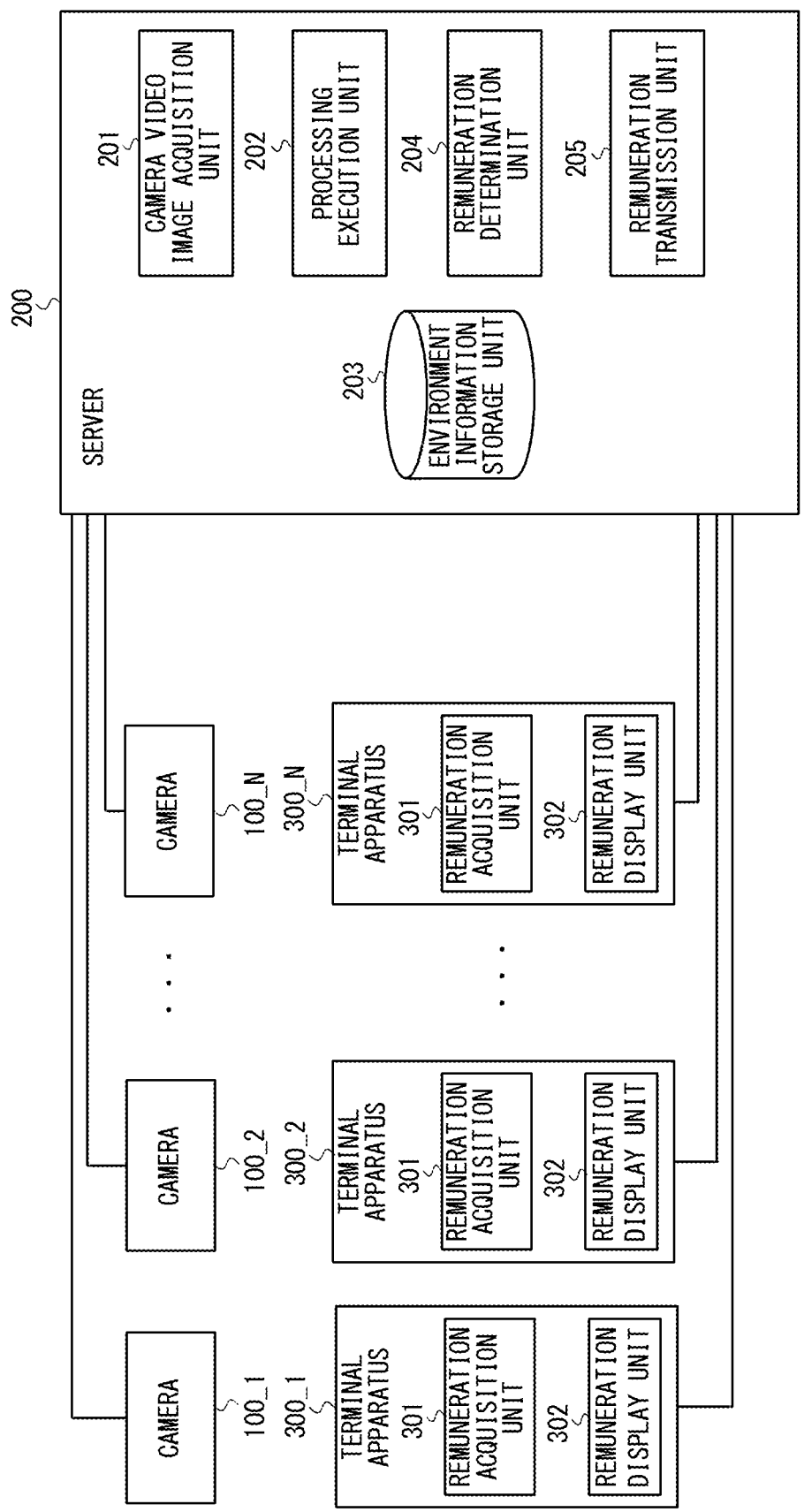
FIG. 2 is a block diagram showing an example of a configuration of an information processing system according to the example embodiment.

Next, details of the example embodiment are described. FIG. 2 is a block diagram showing an example of a configuration of an information processing system 10 according to the example embodiment. As shown in FIG. 2, the information processing system 10 includes cameras 100_1 to 100_N, a server 200, and terminal apparatuses 300_1 to 300_N. Here, N is an integer of 1 or more. Note that in the following description, the cameras 100_1 to 100_N are simply referred to as the cameras 100 when they are referred to without being particularly distinguished from each other. Further, similarly, in the following description, the terminal apparatuses 300_1 to 300_N are simply referred to as the terminal apparatuses 300 when they are referred to without being particularly distinguished from each other.

The terminal apparatuses 300 for the respective cameras 100 are shown in the configuration shown in FIG. 2, and each of the terminal apparatuses 300 receives information (hereinafter referred to as remuneration information) about a remuneration for provision of an environment for acquiring video image data of the camera 100. However, such a configuration is merely an example, and the configuration of the information processing system 10 may instead be a configuration in which there is one terminal apparatus 300 for a plurality of cameras 100 and the one terminal apparatus 300 receives remuneration information about these cameras 100. Further, when it is not necessary to receive the remuneration information, the information processing system 10 may not include the terminal apparatus 300.

The camera 100 is a camera for shooting a traffic state. The camera 100 is, for example, a camera for shooting a traffic state at an intersection. However, a place to be shot by the camera 100 is not limited to this. The camera 100 transmits the shot video image data to the server 200 via a wired or wireless network. In this example embodiment, the camera 100 transmits the video image data and a camera ID, which is an identifier for identifying the camera 100, to the server 200.

It is necessary for the camera 100 to be installed at a position where it can shoot a place to be shot. However, it is not always easy to secure such an installation place. In particular, it is not easy to secure an installation place where the one camera 100 can shoot the entire shooting range (e.g., an entire intersection) required for predetermined processing. For example, if the installation place has a certain height, it may be possible to shoot the entire shooting range to be required. However, it costs a lot to construct such a place. On the other hand, if an existing structure, such as a balcony installed in a condominium and a building, and a tower equipped with a base station of a communication operator, can be used as the installation place, it is possible to reduce the cost required to secure the installation place. Further, it is possible to also reduce the cost regarding the power source that supplies power to the camera 100 and the cost regarding the securing of a network for transmitting video image data of the camera 100 by renting them.

By setting a remuneration for provision of an environment (places and devices) required for the server 200 to acquire video image data, it is expected that the provision of an environment will be promoted. Therefore, this example embodiment discloses a mechanism for giving a remuneration which is a price for renting such an environment.

As shown in FIG. 2, the server 200 includes a camera video image acquisition unit 201, a processing execution unit 202, an environment information storage unit 203, a remuneration determination unit 204, and a remuneration transmission unit 205.

The camera video image acquisition unit 201 corresponds to the camera video image acquisition unit 2 shown in FIG. 1 and acquires video image data from the camera 100. In this example embodiment, the camera video image acquisition unit 201 acquires video image data from each of the cameras 100 via a network.

The processing execution unit 202 executes predetermined processing by using the video image data acquired by the camera video image acquisition unit 201. The predetermined processing may be any processing using video image data. For example, the processing execution unit 202 analyzes video image data by image processing, thereby performing processing for detecting a traffic volume, the speed of a vehicle, the crossing of roads by a pedestrian, the occurrence of a circumstance that obstructs traffic, and so on. Further, the process execution unit 202 may execute various processes based on a result of the detection.

The environment information storage unit 203 stores environment information which is information showing features of an environment to be rented. For example, the environment information storage unit 203 stores the camera ID, a user ID, and environment information in association with each other as shown in FIG. 3. As described above, the camera ID is an identifier for identifying the camera 100. The user ID is an identifier for identifying a person who receives a remuneration. Note that the environment required for the server 200 to acquire video image data is, for example, an installation place of the camera 100, the camera 100, a power source that supplies power to the camera 100, and a network device or a network line for transmitting the video image data.

The environment information is used by the remuneration determination unit 204 to determine a remuneration. The environment information includes, for example, installation position information, camera performance information, power source information, and network information. The installation position information and the camera performance information are specific examples of information pieces indicating the characteristics of the camera 100.

The installation position information is information for evaluating the installation position of the camera 100, and is, for example, an evaluation value indicating the degree of satisfaction of the conditions of the installation position required for shooting a desired video image. The evaluation value indicating the degree of satisfaction of the conditions of the installation position is set in advance based on evaluation items such as an object to be shot by the camera 100, the width of the shooting range of the camera 100, or the shooting direction of the camera 100. Note that the installation position information may be any information for evaluating the installation position of the camera 100, and it is not limited to the evaluation value and may be, for example, a value of each evaluation item used to calculate the evaluation value.

The camera performance information is information for evaluating the performance of the camera 100, and is, for example, an evaluation value for the performance of the camera 100 that affects the image quality of video image data. The evaluation value for the performance of the camera 100 is set in advance based on evaluation items such as the resolution, the specifications of the lens of the camera 100, and the specifications of the image pickup device of the camera 100. Note that the camera performance information may be any information for evaluating the performance of the camera 100, and it is not limited to the evaluation value, and may be, for example, a value of each evaluation item used to calculate the evaluation value.

The power source information is information for evaluating a power source that supplies power to the camera 100, and is, for example, an evaluation value for the power source. The evaluation value for the power source is set in advance based on evaluation items such as the degree of stability of the power source. Note that the power source information may be any information for evaluating the power source that supplies power to the camera 100, and it is not limited to the evaluation value, but may be, for example, a value of each evaluation item used to calculate the evaluation value.

The network information is information for evaluating a network for transmitting video image data of the camera 100, and is, for example, an evaluation value for the network. The evaluation value for the network is set in advance based on evaluation items such as the communication speed and the degree of stability of communication. Note that the network information may be any information for evaluating the network, and it is not limited to the evaluation value, but may be, for example, a value of each evaluation item used to calculate the evaluation value.

Note that the environment information storage unit 203 stores, in association with the user ID of the user and the camera ID of the corresponding camera 100, environment information about the environment lent by a user among environments such as an installation place, a camera, a power source, and a network.

The remuneration determination unit 204 corresponds to the remuneration determination unit 3 shown in FIG. 1 and determines a remuneration for provision of an environment for the camera video image acquisition unit 201 to acquire video image data. That is, the remuneration determination unit 204 determines a remuneration as a price regarding renting an environment required to acquire video image data. In this example embodiment, the remuneration determination unit 204 determines how high a value of the remuneration should be based on environment information for each user stored in the environment information storage unit 203. The remuneration determination unit 204 determines, based on environment information about the environments provided by users, a remuneration for provision of an environment by each user. For example, when a user provides only the installation place of the camera 100, the remuneration determination unit 204 determines a remuneration based on installation position information associated with the user. Further, for example, when a user provides the camera 100 and the installation place therefor, the remuneration determination unit 204 determines a remuneration based on the installation position information and the camera performance information that are associated with the user.

For example, when the environment information is an evaluation value, the remuneration determination unit 204 determines, as a price for the provision of the environment by a user, a remuneration having a value corresponding to the evaluation value. Further, when the environment information is not an evaluation value, the remuneration determination unit 204, for example, calculates an evaluation value based on the environment information and determines, as a price for the provision of the environment by the user, a remuneration having a value corresponding to the calculated evaluation value.

It should be noted that a remuneration means any price given to a user who has provided an environment. For example, the remuneration may be money, or points, electronic money, virtual currency, and the like that can be used as a substitute for cash. Further, the remuneration may be information useful to a user, such as traffic information obtained by processing performed by the processing execution unit 202. The more useful the information (high quality information or a large amount of information), the higher its value as a remuneration. Obviously, the above kinds of remuneration are merely examples of remunerations, and remunerations are not limited to these examples.

In this example embodiment, the remuneration determination unit 204 calculates a remuneration corresponding to the feature of the camera 100 for a user who has provided the installation place of the camera 100 or the camera 100. That is, the remuneration determination unit 204 calculates a remuneration corresponding to the installation place of the camera 100 or the performance of the camera 100.

More specifically, the remuneration determination unit 204 calculates, as a remuneration for a user who has provided the installation place, a remuneration corresponding to the installation place of the camera 100 based on installation position information. As described above, in this example embodiment, as the remuneration determination unit 204 calculates a remuneration corresponding to the provided installation place, it is possible to promote provision of an environment for acquiring a video image shot with a desired composition (a shooting range, a shooting direction, etc.). That is, it is possible to promote the improvement of an environment in which the processing execution unit 202 executes processing using video image data shot with a desired composition.

Further, in particular, the remuneration determination unit 204 may determine a remuneration for provision of an environment in which a video image including the entire predetermined observation point can be shot so that the remuneration has greater value than that for provision of an environment in which such a video image cannot be shot. By doing so, it can be expected that the number of cameras 100 for shooting the observation point will be reduced.

Further, the remuneration determination unit 204 calculates, as a remuneration for a user who has provided the camera 100, a remuneration corresponding to the performance of the camera 100 based on camera performance information. Accordingly, it is possible to promote provision of an environment for acquiring a video image shot with a desired image quality. That is, it is possible to promote the improvement of an environment in which the processing execution unit 202 executes processing using video image data shot with a desired image quality.

Further, the remuneration determination unit 204 calculates a remuneration for provision of a power source that supplies power to the camera 100 based on power source information. Thus, it is possible to promote the improvement of an environment for the power source. Further, the remuneration determination unit 204 calculates a remuneration for provision of a network used to transmit video image data from the camera 100 based on network information. Thus, it is possible to promote the improvement of an environment for the network.

The remuneration transmission unit 205 transmits remuneration information determined by the remuneration determination unit 204 to the terminal apparatus 300. The remuneration transmission unit 205 transmits, for example, remuneration information determined based on the environment provided by a user to the terminal apparatus 300 used by the user. It should be noted that the remuneration information is, for example, information indicating a content of the remuneration determined by the remuneration determination unit 204. For example, in the case of a monetary remuneration, the remuneration information may be a notification of the amount of the remuneration. Further, when the remuneration is information useful to a user, the remuneration information may be this useful information.

Next, the terminal apparatus 300 is described. As shown in FIG. 2, the terminal apparatus 300 includes a remuneration acquisition unit 301 and a remuneration display unit 302.

The remuneration acquisition unit 301 acquires remuneration information transmitted from the server 200. The remuneration acquisition unit 301 acquires remuneration information from the server 200 via, for example, a wired or wireless network.

The remuneration display unit 302 displays information acquired by the remuneration acquisition unit 301 on a display device 354 (see FIG. 5) of the terminal apparatus 300. By this configuration, a user can confirm the remuneration given as a price for the provision of an environment.

Figure 4:
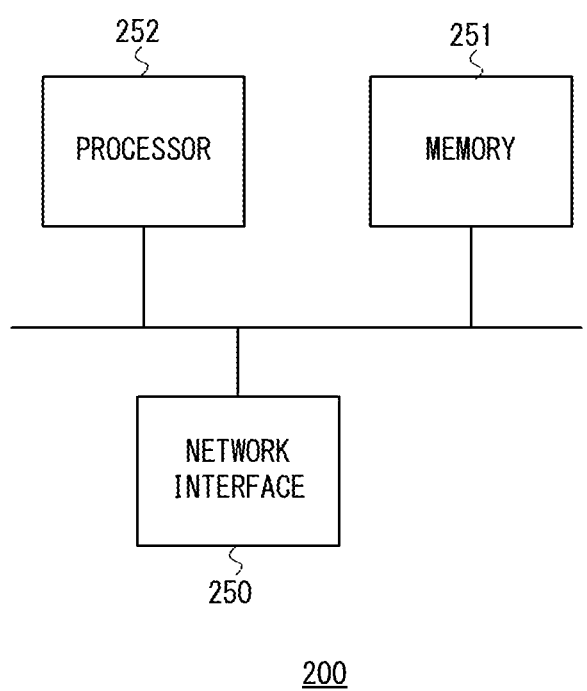
FIG. 4 is a block diagram showing an example of a hardware configuration of a server according to the example embodiment.
Figure 5:
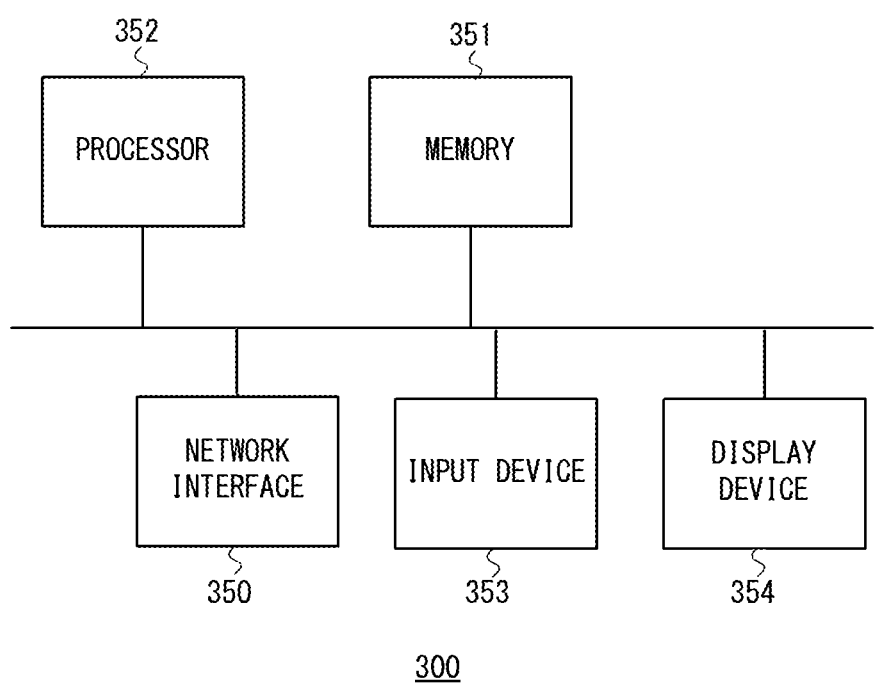
FIG. 5 is a block diagram showing an example of a hardware configuration of a terminal apparatus according to the example embodiment.

Next, hardware configurations of the server 200 and the terminal apparatus 300 are described. FIG. 4 is a block diagram showing an example of the hardware configuration of the server 200. Further, FIG. 5 is a block diagram showing an example of the hardware configuration of the terminal apparatus 300.

As shown in FIG. 4, the server 200 includes, for example, a network interface 250, a memory 251, and a processor 252. Further, as shown in FIG. 5, the terminal apparatus 300 includes, for example, a network interface 350, a memory 351, a processor 352, an input device 353, and the display device 354.

The network interface 250 is used to communicate with the terminal apparatus 300. Similarly, the network interface 350 is used to communicate with the server 200. Each of the network interfaces 250 and 350 may include, for example, a network interface card (NIC).

Each of the memories 251 and 351 is composed of, for example, a combination of a volatile memory and a non-volatile memory. The memory 251 is used to store software (a computer program) including at least one instruction executed by the processor 252. Similarly, the memory 351 is used to store software (a computer program) including at least one instruction executed by the processor 352.

The above programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Each of the processors 252 and 352 may be, for example, a microprocessor, a Micro Processor Unit (MPU), or a Central Processing Unit (CPU). Each of the processors 252 and 352 may include a plurality of processors. The processor 252 loads a computer program from the memory 251 and executes the loaded computer program, thereby performing the processing of each component of the server 200 shown in FIG. 2. Similarly, the processor 352 loads a computer program from the memory 351 and executes the loaded computer program, thereby performing the processing of each component of the terminal apparatus 300 shown in FIG. 2. Note that the environment information storage unit 203 of the server 200 is implemented by the memory 251 or a storage device (not shown). While the example in which the server 200 includes the environment information storage unit 203 has been described in this example embodiment, the environment information storage unit 203 may be implemented by another apparatus such as a database apparatus.

The input device 353 is a device such as a keyboard that receives an input from a user. The display device 354 is a device such as a display that displays information.

Note that while the example in which the camera 100 and the terminal apparatus 300 are separate devices has been described in this example embodiment, the camera 100 may instead be mounted on the terminal apparatus 300, for example, like a smartphone.

Figure 6:
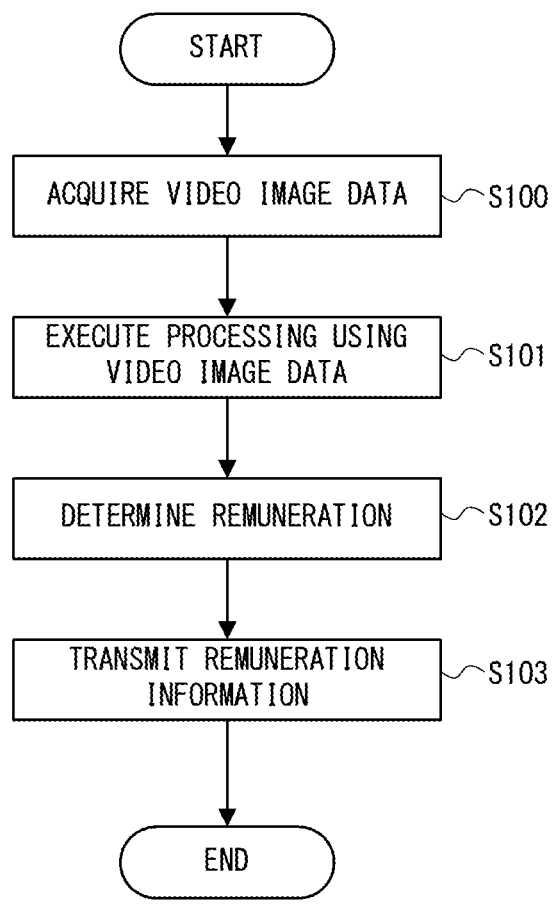
FIG. 6 is a flowchart showing an example of an operation of the server according to the example embodiment.

Next, an operation example of the server 200 is described. FIG. 6 is a flowchart showing an example of an operation of the server 200. The operation of the server 200 is described below with reference to FIG. 6.

In Step 100 (S100), the camera video image acquisition unit 201 acquires video image data from the camera 100.

Next, in Step 101 (S101), the process execution unit 202 executes the predetermined processing using the video image data acquired by the camera video image acquisition unit 201.

Next, in Step 102 (S102), the remuneration determination unit 204 determines a remuneration for provision of an environment.

Next, in Step 103 (S103), the remuneration transmission unit 205 transmits remuneration information determined in Step 102 to the terminal apparatus 300. As a result, in the terminal apparatus 300, the remuneration acquisition unit 301 acquires information, and the remuneration display unit 302 displays the information.

Note that the operation flow described above is merely an example, and the operation may proceed in an order different from the above. For example, after the remuneration is determined, video image data may be acquired and the predetermined processing may be executed.

Modified Example 1

Figure 7:
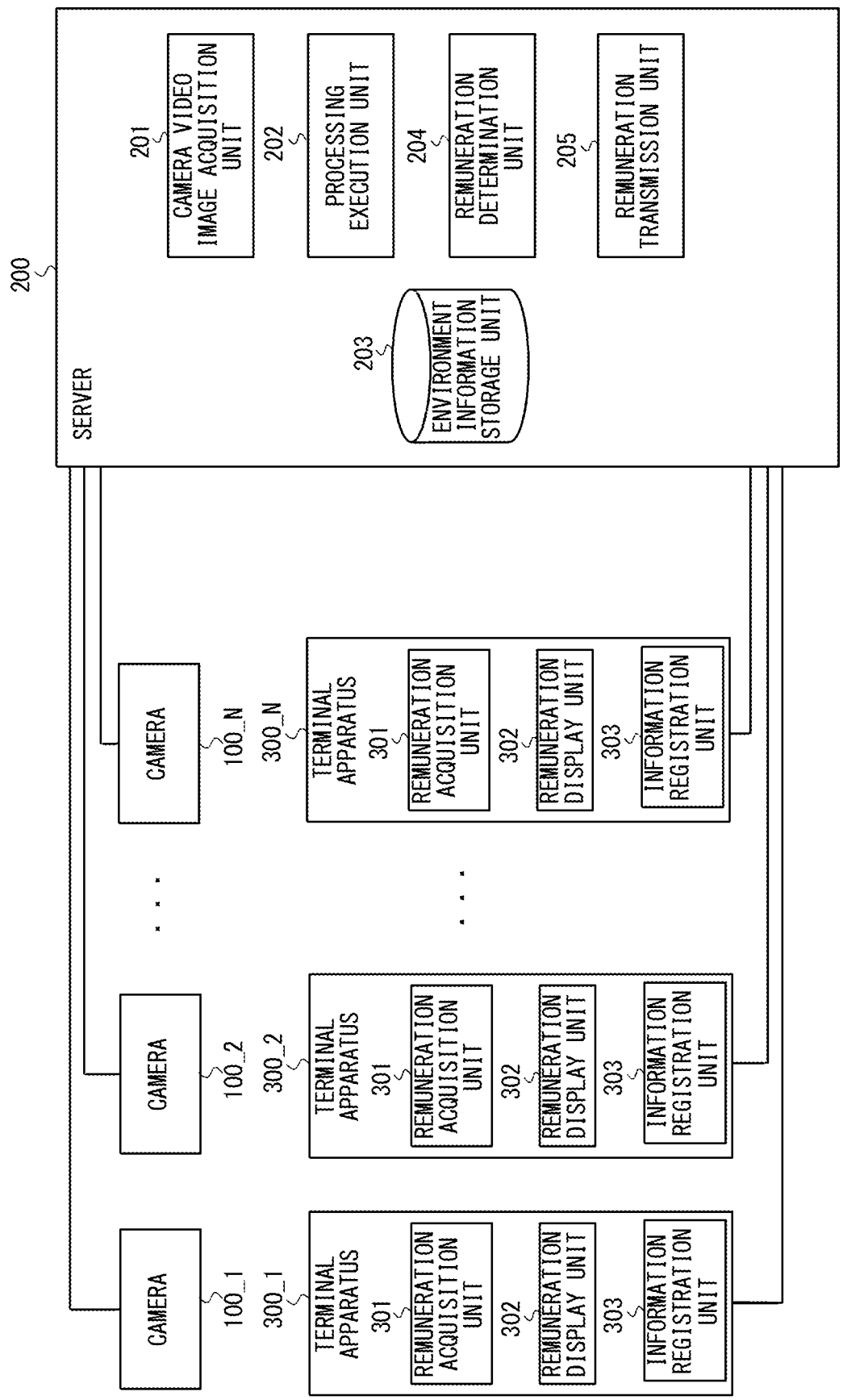
FIG. 7 is a block diagram showing an example of a configuration of an information processing system according to a modified example 1 of the example embodiment.

Next, a modified example of the above-described embodiment is described. FIG. 7 is a block diagram showing an example of a configuration of an information processing system 11 according to a modified example 1 of the example embodiment. As shown in FIG. 7, the information processing system 11 according to the modified example 1 differs from the above-described example embodiment in that the terminal apparatus 300 further includes an information registration unit 303. Note that the information registration unit 303 is also implemented, for example, by the processor 352 loading a computer program from the memory 351 and executing it.

While the example in which information shown in FIG. 3 is registered in advance in the environment information storage unit 203 has been described in the above-described example embodiment, information can instead be registered from the terminal apparatus 300 in this modified example. The information registration unit 303 of the terminal apparatus 300 acquires information to be registered in the environment information storage unit 203 based on information input from a user through the input device 353. That is, the information registration unit 303 acquires, for example, environment information about the environment to be lent by a user, a user ID of the user, and a camera ID for specifying which camera 100 the environment to be lent is for, and transmits it to the server 200. In the server 200, information transmitted from the terminal apparatus 300 is stored in the environment information storage unit 203. By this configuration, it is possible to easily set information necessary for a determination of a remuneration.

Modified Example 2

Figure 8:
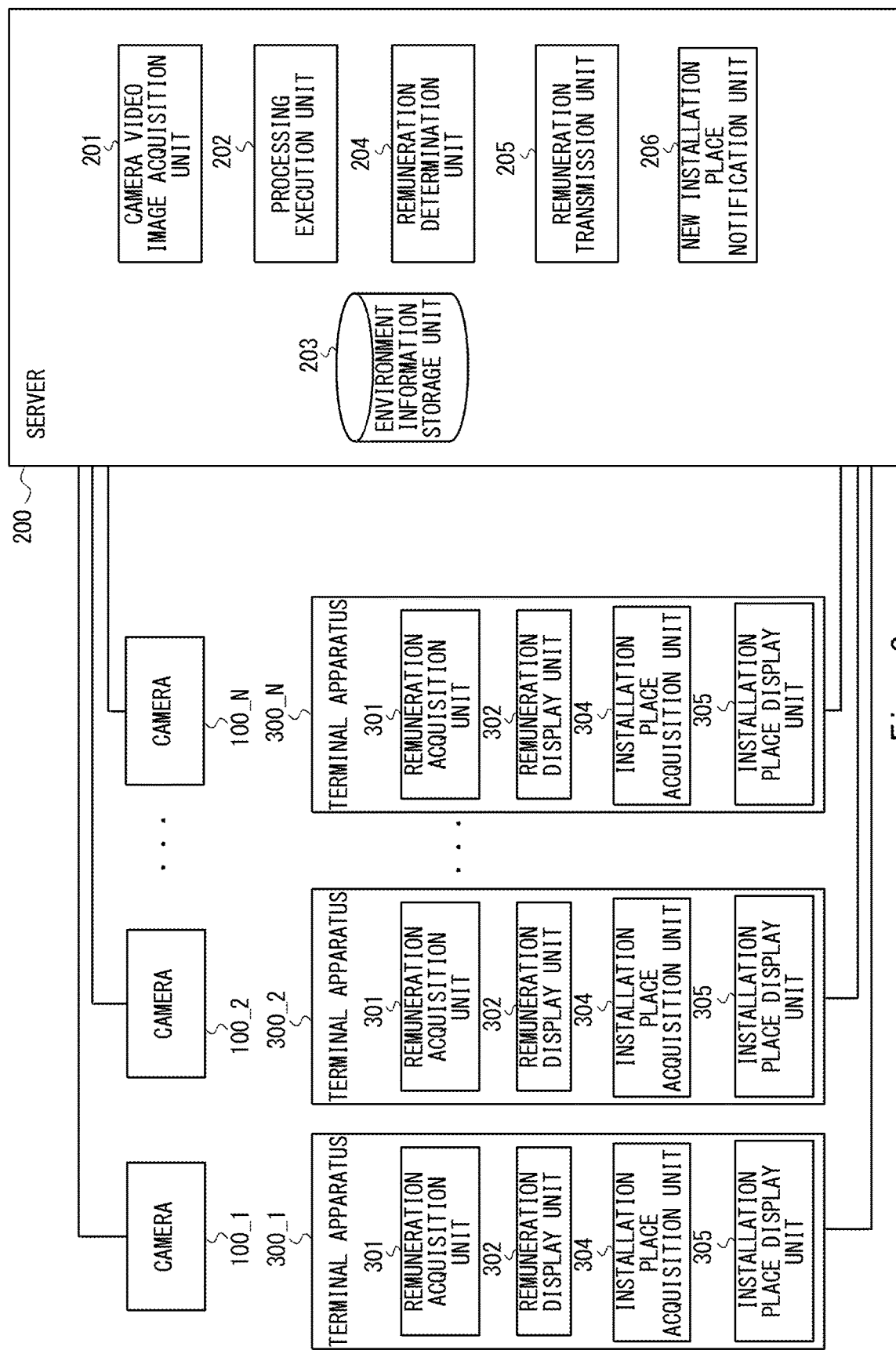
FIG. 8 is a block diagram showing an example of a configuration of an information processing system according to a modified example 2 of the example embodiment.

FIG. 8 is a block diagram showing an example of a configuration of an information processing system 12 according to a modified example 2 of the example embodiment. As shown in FIG. 8, the information processing system 11 according to the modified example 2 differs from the above-described example embodiment in that the server 200 further includes a new installation place notification unit 206 and the terminal apparatus 300 further includes an installation place acquisition unit 304 and an installation place display unit 305. Note that the new installation place notification unit 206 is also implemented, for example, by the processor 252 loading a computer program from the memory 251 and executing it. Similarly, each of the installation place acquisition unit 304 and the installation place display unit 305 is also implemented, for example, by the processor 352 loading a computer program from the memory 351 and executing it.

The new installation place notification unit 206 of the server 200 notifies the terminal apparatus of a new installation place of the camera 100 that shoots a traffic state. Specifically, for example, the new installation place notification unit 206 simultaneously notifies a plurality of terminal apparatuses 300 of information about the new installation place input to the server 200.

The installation place acquisition unit 304 of the terminal apparatus 300 acquires information about the new installation place transmitted from the server 200. The installation place acquisition unit 304 acquires information about the installation place from the server 200, for example, via a wired or wireless network.

The installation place display unit 305 displays the information acquired by the installation place acquisition unit 304 on the display device 354 of the terminal apparatus 300.

By this configuration, it is possible to inform a user of the terminal apparatus 300 of a place where provision of an environment is required. Thus, it is possible to promote the improvement of an environment.

Note that the present disclosure is not limited to the above-described example embodiment and can be modified as appropriate without departing from the spirit of the present disclosure. For example, the camera video image acquisition unit 201 may acquire video image data selected in accordance with the feature of the camera 100 from among video image data pieces from the plurality of cameras 100 that shoot a traffic state at the same observation point. That is, the camera video image acquisition unit 201 may acquire video image data selected based on the installation place of the camera 100 or the performance of the camera 100. For example, the camera video image acquisition unit 201 may acquire video image data of the camera 100 installed at the best installation place among the cameras 100 that shoot the same observation point. In such a case, the processing execution unit 202 executes the predetermined processing by using the selected video image data. By adopting the above configuration, the predetermined processing can be performed by using video image data suitable for the processing.

Further, when video image data is used for the processing executed by the processing execution unit 202, the remuneration determination unit 204 may determine a remuneration for provision of an environment for acquiring the video image data. By adopting such a configuration, it is possible to give a remuneration to a provider of the environment for the video image data that has actually been useful in performing the processing of the processing execution unit 202.

Further, the whole or part of the example embodiment disclosed above can be described as, but not limited to, the following supplementary notes.

(Supplementary Note 1)

An information processing apparatus comprising:
camera video image acquisition means for acquiring video image data from a camera configured to shoot a traffic state; and
remuneration determination means for determining a remuneration for provision of an environment for the camera video image acquisition means to acquire the video image data based on a feature of the camera.

(Supplementary Note 2)

The information processing apparatus described in Supplementary Note 1, wherein the feature is an installation place of the camera.

(Supplementary Note 3)

The information processing apparatus described in Supplementary Note 2, wherein the remuneration determination means determines a remuneration for provision of an environment in which a video image including an entire predetermined observation point can be shot so that the remuneration has greater value than that for provision of an environment in which the video image including the entire predetermined observation point cannot be shot.

(Supplementary Note 4)

The information processing apparatus described in any one of Supplementary Notes 1 to 3, wherein the feature is a performance of the camera.

(Supplementary Note 5)

The information processing apparatus described in any one of Supplementary Notes 1 to 4, wherein the remuneration determination means calculates a remuneration for provision of a power source that supplies power to the camera or a remuneration for provision of a network used to transmit the video image data from the camera.

(Supplementary Note 6)

The information processing apparatus described in any one of Supplementary Notes 1 to 5, further comprising remuneration transmission means for transmitting information about the remuneration determined by the remuneration determination means to a terminal apparatus.

(Supplementary Note 7)

The information processing apparatus described in any one of Supplementary Notes 1 to 6, further comprising processing execution means for executing predetermined processing by using the video image data acquired by the camera video image acquisition means, wherein
the camera video image acquisition means acquires video image data selected in accordance with the feature of the camera from among video image data pieces from a plurality of cameras that shoot a traffic state at the same observation point, and
the processing execution means executes the predetermined processing by using the selected video image data.

(Supplementary Note 8)

The information processing apparatus described in any one of Supplementary Notes 1 to 6, further comprising the processing execution means for executing predetermined processing by using the video image data acquired by the camera video image acquisition means, wherein
when video image data is used for the processing executed by the processing execution means, the remuneration determination means determines a remuneration for provision of an environment for acquiring the video image data.

(Supplementary Note 9)

The information processing apparatus described in any one of Supplementary Notes 1 to 8, further comprising new installation place notification means for notifying the terminal apparatus of a new installation place of the camera that shoots the traffic state.

(Supplementary Note 10)

An information processing system comprising:
a camera configured to shoot a traffic state; and
an information processing apparatus, wherein
the information processing apparatus comprises:
camera video image acquisition means for acquiring video image data from the camera; and
remuneration determination means for determining a remuneration for provision of an environment for the camera video image acquisition means to acquire the video image data based on a feature of the camera.

(Supplementary Note 11)

The information processing system described in Supplementary Note 10, wherein the feature is an installation place of the camera.

(Supplementary Note 12)

An information processing method comprising causing an information processing apparatus to:
acquire video image data from a camera configured to shoot a traffic state; and
determine a remuneration for provision of an environment for acquiring the video image data based on a feature of the camera.

(Supplementary Note 13)

A non-transitory computer readable medium storing a program for causing a computer to execute:
a camera video image acquisition step of acquiring video image data from a camera configured to shoot a traffic state; and
a remuneration determination step of determining a remuneration for provision of an environment for acquiring the video image data based on a feature of the camera.

While the present disclosure has been described with reference to the example embodiment, the present disclosure is not limited to the aforementioned example embodiment. Various changes that can be understood by those skilled in the art can be made to the configurations and the details of the present disclosure within the scope of the present disclosure.

This application is based upon and claims the benefit of priority from Japanese patent application No. 2018-066015, filed on Mar. 29, 2018, the disclosure of which is incorporated herein in its entirety by reference.

REFERENCE SIGNS LIST

1 INFORMATION PROCESSING APPARATUS
2, 201 CAMERA IMAGE ACQUISITION UNIT
202 PROCESSING EXECUTION UNIT
3, 204 REMUNERATION DETERMINATION UNIT
10, 11, 12 INFORMATION PROCESSING SYSTEM

100 CAMERA
200 SERVER
203 ENVIRONMENT INFORMATION STORAGE UNIT
205 REMUNERATION TRANSMISSION UNIT
206 NEW INSTALLATION PLACE NOTIFICATION UNIT
250, 350 NETWORK INTERFACE
251, 351 MEMORY
252, 352 PROCESSOR
300 TERMINAL APPARATUS
301 REMUNERATION ACQUISITION UNIT
302 REMUNERATION DISPLAY UNIT
303 INFORMATION REGISTRATION UNIT
304 INSTALLATION PLACE ACQUISITION UNIT
305 INSTALLATION PLACE DISPLAY UNIT
353 INPUT DEVICE
354 DISPLAY DEVICE

The invention claimed is:

1. An information processing apparatus comprising:
at least one memory storing program instructions; and
at least one processor configured to execute the instructions stored in the memory to:
acquire video image data from a camera configured to shoot a traffic state;
execute predetermined processing by using the acquired video image data of an entire intersection, wherein the predetermined processing includes detecting a traffic volume;
determine a remuneration for provision of an environment for acquiring the video image data based on a feature of the camera; and
calculate a remuneration for provision of a power source that supplies power to the camera or a remuneration for provision of a network used to transmit the video image data from the camera, wherein
the feature includes at least an installation place of the camera, and
provision of an environment in which a video image including the entire intersection required for the predetermined processing can be shot has remuneration of a greater value than provision of an environment in which a video image including a part of the intersection can be shot.

2. The information processing apparatus according to claim 1, wherein the feature includes a performance of the camera.

3. The information processing apparatus according to claim 1, wherein the processor is further configured to execute the instructions to transmit information about the determined remuneration to a terminal apparatus.

4. The information processing apparatus according to claim 1, wherein
the processor is further configured to execute the instructions to:
acquire video image data selected in accordance with the feature of the camera from among video image data pieces from a plurality of cameras that shoot a traffic state at the same intersection, and
execute the predetermined processing by using the selected video image data.

5. The information processing apparatus according to claim 1, wherein
the processor is further configured to execute the instructions to determine a remuneration for provision of an environment for acquiring the video image data when video image data is used for execution of the predetermined processing.

6. The information processing apparatus according to claim 1, wherein the processor is further configured to execute the instructions to notify the terminal apparatus of a new installation place of the camera that shoots the traffic state.

7. An information processing method comprising causing an information processing apparatus to:
acquire video image data from a camera configured to shoot a traffic state;
execute predetermined processing by using the acquired video image data of an entire intersection, wherein the predetermined processing includes detecting a traffic volume;
determine a remuneration for provision of an environment for acquiring the video image data based on a feature of the camera; and
calculate a remuneration for provision of a power source that supplies power to the camera or a remuneration for provision of a network used to transmit the video image data from the camera, wherein
the feature includes at least an installation place of the camera, and
provision of an environment in which a video image including the entire intersection required for the predetermined processing can be shot has remuneration of a greater value than provision of an environment in which a video image including a part of the intersection can be shot.

8. A non-transitory computer readable medium storing a program for causing a computer to execute:
a camera video image acquisition step of acquiring video image data from a camera configured to shoot a traffic state;
a processing execution step of executing predetermined processing by using the acquired video image data of an entire intersection, wherein the predetermined processing includes detecting a traffic volume;
a remuneration determination step of determining a remuneration for provision of an environment for acquiring the video image data based on a feature of the camera; and
a remuneration calculation step of calculating a remuneration for provision of a power source that supplies power to the camera or a remuneration for provision of a network used to transmit the video image data from the camera, wherein
the feature includes at least an installation place of the camera, and
provision of an environment in which a video image including the entire intersection required for the predetermined processing can be shot has remuneration of a greater value than provision of an environment in which a video image including a part of the intersection can be shot.

9. The information processing apparatus according to claim 1, wherein the remuneration for provision of the power source is calculated based on a degree of stability of the power source.

10. The information processing apparatus according to claim 1, wherein the remuneration for provision of the network is calculated based on a communication speed of the network or a degree of stability of communication in the network.

* * * * *